Oct. 30, 1962     J. M. MORRIS     3,061,079
TUNABLE VIBRATION EXCITER
Filed Nov. 28, 1958     2 Sheets-Sheet 1
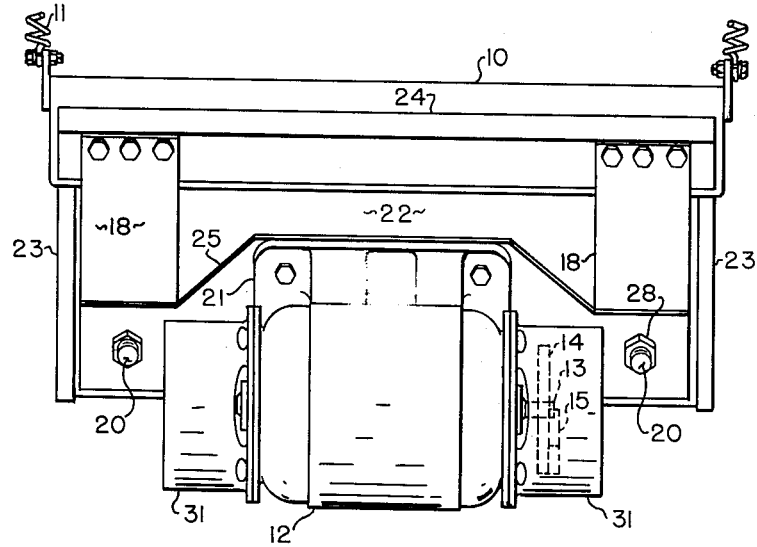
Fig. II
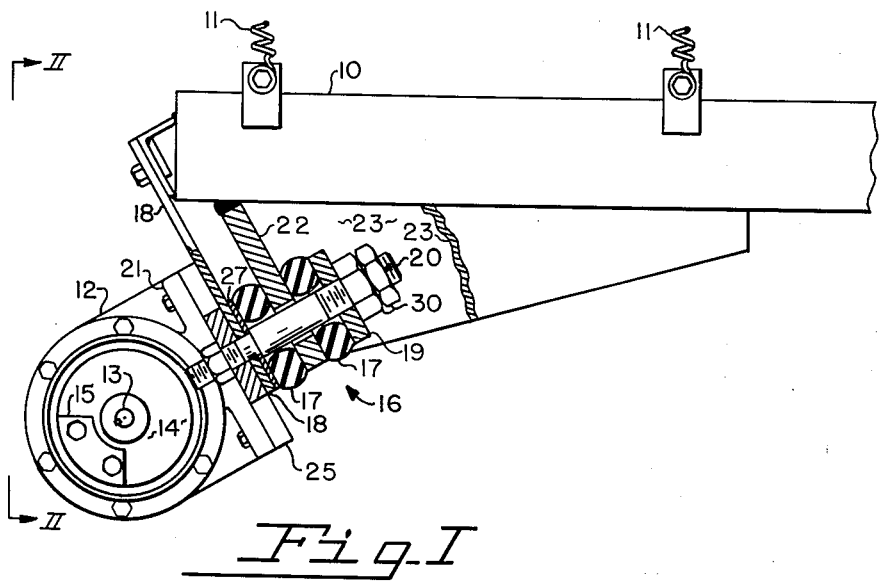
Fig. I
INVENTOR.
JOHN M. MORRIS
BY
Marshall, Marshall & Yeasting
ATTORNEYS Oct. 30, 1962                J. M. MORRIS                3,061,079
                        TUNABLE VIBRATION EXCITER
Filed Nov. 28, 1958                                 2 Sheets-Sheet 2
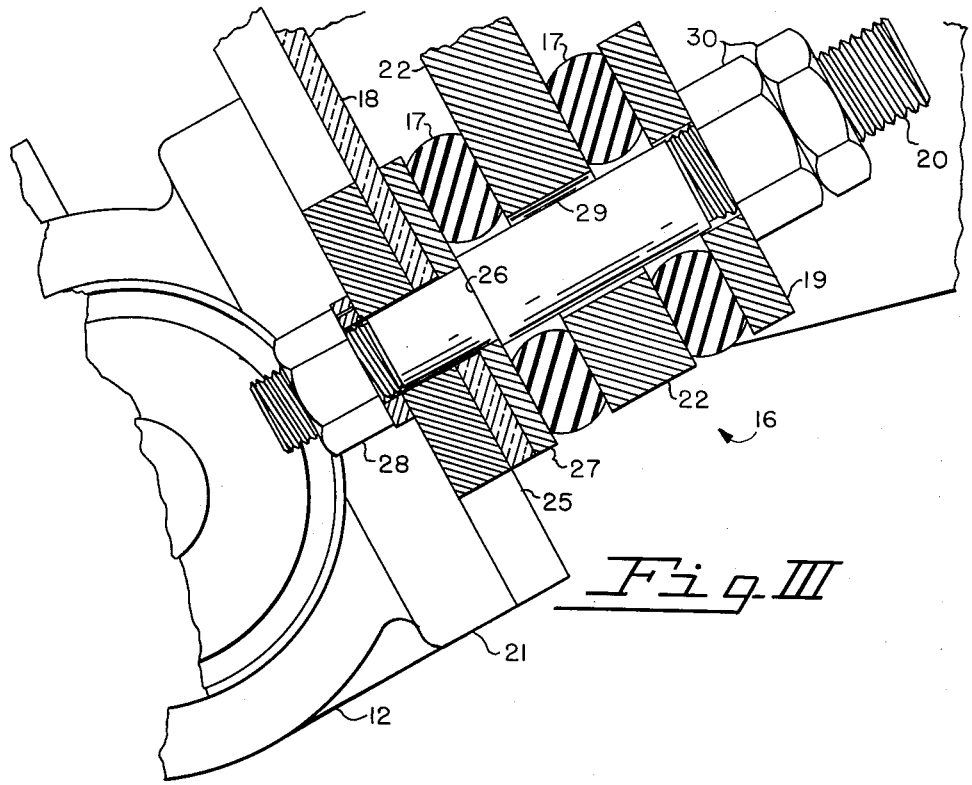
Fig. III
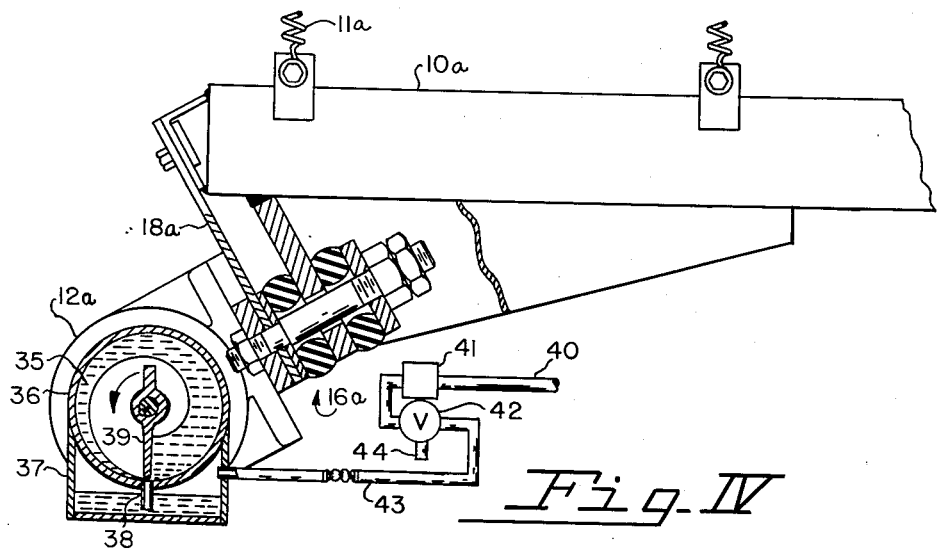
Fig. IV
INVENTOR.
JOHN M. MORRIS
BY
Marshall, Marshall & Yeasting
ATTORNEYS United States Patent Office 3,061,079
Patented Oct. 30, 1962

3,061,079
TUNABLE VIBRATION EXCITER
John M. Morris, Louisville, Ky., assignor, by mesne assignments, to Chain Belt Company, Milwaukee, Wis., a corporation of Wisconsin
Filed Nov. 28, 1958, Ser. No. 777,083
4 Claims. (Cl. 198—220)

This invention relates to vibratory equipment and in particular to a simple, inexpensive tunable vibration exciter, the resonant frequency of which can be adjusted manually while the system is in operation.

Eccentric weights on rotating shafts have often been used as vibration generators for vibratory equipment. One particularly efficient method is to mount the shaft carrying the eccentric weight in a separate exciter mass which in turn is resiliently coupled to the work member, for example a vibratory conveyor, and tuning the system so that the exciter mass on its springs is resonant at substantially the desired operating frequency. By making the mass of the exciter small compared to the mass of the work member the resilient coupling elements connecting the exciter member to the work member determine the resonant frequency and such natural frequency does not vary appreciably with ordinary changes in mass of the work member. Howeevr, if constant speed motors, the most commonly available type, are to be employed to drive the eccentric mass it is necessary to select the operating speed so that the system operates near the resonant frequency so as to take advantage of the amplitude magnificiation afforded by such resonant operation. The principal disadvantage of this type of system is the fact that the amplitude of vibration is not readily adjustable while the system is in operation. To adjust the amplitude of vibration either the eccentricity or mass of the unbalance weights must be changed or the speed of operation of the motor or the drive ratio between the motor and the eccentric weights be varied in order to change the operating speed and thus the degree of magnification.

The principal object of this invention is to provide a low cost adjustable resilient coupling member for connecting an exciter mass to a work member.

Another object of the invention is to provide a resilient coupling member the elements of which have non-linear characteristics such that the natural or resonant frequency of the system may be adjusted by preloading the resilient elements.

A still further object of the invention is to provide a simple vibration generator employing eccentric weights carried directly on the shaft of a motor the frame of which is coupled to the work member through opposed non-linear resilient elements, the preload of which may be varied to tune the system to its desired operating speed.

A more specific object is to provide a tunable vibration exciter in which a plurality of annular members formed of rubber or similar resilient material are employed as coupling members to couple the exciter member to a work member.

More specfic objects and advantages are apparent from the following description of a preferred form of the invention.

According to the invention a constant speed motor is provided with eccentric weights at each end of its shaft, for reasons of symmetry, and the frame of the motor is connected to the work member through a tunable or adjustable resilient coupling, the spring rate of which may be varied while the system is in operation. The invention further contemplates employing as resilient members a plurality of elements each having individually a non-linear spring rate and combining such elements to provide a substantially linear spring rate that may be varied by varying the preload of the resilient elements.

A preferred embodiment of the invention is illustrated in the accompanying drawings.

In the drawings:

FIG. I is a side elevation, parts being shown in section, of an elementary vibratory conveyor equipped with the improved vibration generator.

FIG. II is an end elevation of a conveyor as seen from the line II—II of FIG. I.

FIG. III is a greatly enlarged vertical section of one of the resilient coupling assemblies forming the resilient coupling between the exciter member and the work member.

FIG. IV is a view generally similar to FIG. I showing a form of unbalance weight that is adjustable during operation of the equipment.

These specific figures and the accompanying description are intended merely to illustrate the invention and not to impose limitations on its scope.

In the structure illustrated in FIG. I a conveyor trough 10 constituting the work member of the system is supported on a plurality of soft springs 11 that vibrationally isolate the work member from the building structure or frame from which it is supported.

A housing or frame 12 of an electric motor serves as the exciter mass or member of the system. The motor includes an armature shaft 13 which at each end carries a disk 14 equipped with an unbalanced weight 15. Rotation of the motor by rotating the eccentric weights 15 produces vibratory motion of the motor frame which is transmitted through one or more resilient couplings 16 each comprising at least one pair of rubber doughnut-shaped pieces 17 that are sandwiched between one face of a cantilever guide spring 18 for the motor frame 12 and a pressure plate 19 fitting as a washer over a stud 20 which is rigidly connected at one end to a base 21 of the motor frame 12 and which extends through the doughnut-shaped rubber pieces 17. A downwardly depending bracket 22 reinforced by gusset plates 23 attached to the conveyor trough 10 is interposed between the doughnut-shaped rubber pieces 17 and serves to transmit the vibratory force from the exciter member 12 to the work member 10.

The guide spring 18 may be either a guided cantilever attached at its lower end to the base 21 of the motor 12 and at its upper end to a bracket 24 attached to the end of the conveyor 10 or it may be a flat, stiff link hinged at each end. Its primary purpose is to guide the exciter member, the motor frame 12, along a path that is inclined to the axis of the work member 10 and is generally perpendicular to the plane of the doughnut-shaped members 17. As indicated in FIG. II the base 21 of the motor frame 12, if desired, may be attached to a bridge plate 25 which extends the full width of the conveyor 10, is attached to the guide springs 18 at each end, and which is connected through resilient coupling assemblies 16 located at each end of the cross-plate 25.

The coupling assembly 16 is illustrated in greater detail in FIG. III. As shown in this figure the stud 20 is, near the exciter end, provided with a shoulder 26 that abuts against a pressure plate 27 and serves to clamp the pressure plate rigidly against the lower end of the spring 18 and the motor support plate 25 as a nut 28 is tightened on the lower end of the stud. The other end of the stud, after passing axially through the rubber doughnut-shaped pieces 17, through a hole 29 in the conveyor plate 22, and the pressure plate 19 is provided with a pair of lock nuts 30 which may be tightened on the stud 20 in order to preload the rubber members 17.

The doughnut-shaped rubber members 17 are preferably circular or elliptical in cross section so that the force resisting deformation of the rubber varies non-linearly with the deflection of the rubber members. Since the spacing between the pressure plate 19 and the plate 27 rigidly attached to the motor frame 12 is fixed by the stud 20 it is apparent that, upon relative motion of the exciter member 12 with respect to the work member 10, one of the annular rubber members of each pair is compressed while the other is expanded. Since the force produced in the compressed member in excess of the average force and the force released in the expanded member 17 both act in the same direction in opposing relative motion of the exciter member 12 from its midposition relative to the work member 10 the rubber members are acting effectively in parallel or what is sometimes known as push-pull. In this arrangement the non-linear increase in force in one of the members substantially cancels the non-linear decrease in force of the other so that, while they are individually non-linear, the pair acting together provides a substantially linear force versus deflection characteristic. The effective combined rate of the two members is thus substantially linear and since adjusting the lock nuts 30 that preload the rubber members 17 increases or decreases the load on each in the same direction by additionally compressing or permitting them to expand allows the rate to be selected according to the non-linear shape of the force-deflection curve of the members 17 considered individually. This system thus provides a readily adjustable coupling member the spring rate of which may be easily varied while the system is in operation by adjustment of the nuts 30 on the stud 20.

The annular rubber springs 17 are examples of a general class of non-linear springs which may include ordinary helical coil springs wound with a variable pitch such that in the working range of deflection some of the coils are active part of the time and close tight against their neighbors during the remainder of the time.

In some applications of vibratory equipment it is desirable to remotely control the amplitude of vibration. In order to provide this additional feature the equipment may be modified, as illustrated in FIG. IV, to include variable eccentric weights for the motor shafts which weights are easily adjustable in magnitude while the system is in operation.

In this figure a conveyor or work member 10a is resiliently supported on springs 11a from a frame or building support. An exciter member 12a comprising a motor frame is connected through a coupling system 16a that is identical to that disclosed in FIGS. I, II and III. In lieu of the unbalanced weights 15 carried on the disks 14 within guards 31 mounted at each end of the motor frame 12 a liquid eccentric mass 35 is illustrated in FIG. IV. The liquid mass 35 is contained partly within a cylindrical shell 36 that is mounted on the motor frame 12a in place of the guards 31 and partly within a reservoir 37 that is integral with the shell and is connected to the interior of the cylindrical shell 36 through a duct 38.

A vane 39 one end of which moves in close but non-contacting relation to the cylindrical inner wall of the shell 36 drives the liquid in the shell 36 ahead of it as the motor rotates. The viscosity of the liquid mass 35 in combination with the roughness of the interior of the cylindrical housing 36 causes the liquid to collect ahead of the vane 39 so that it is disposed non-symmetrically within the cylindrical housing 36. It thus serves as a rotating unbalanced mass that provides the vibratory force for driving the system.

The amount of liquid in the rotating unbalanced mass of liquid 35 is controlled by air pressure in the reservoir 37 which air pressure is obtained from an airline 40 through a filter 41, regulating control valve 42 and flexible lead 43. The control valve 42 serves to maintain a constant selected pressure in the line 43 which pressure serves to force a quantity of liquid from the reservoir 37 through the duct 38 into the cylindrical shell 36. When it is desired to reduce the amplitude of vibration the air pressure in the line 43 is released through the valve 42 and exhaust lead 44 to permit liquid to flow from the cylindrical housing 36 downwardly through the duct 38 into the reservoir 37. In this manner variations in air pressure in line 43, as controlled by the regulating valve 42, changes the effective mass of the unbalanced weights of the vibratory system and therefore changes the amplitude of vibration accordingly.

In a vibratory system including the adjustable resilient coupling members 16 the amplitude of vibration is enhanced over that provided strictly by the unbalanced force by reason of tuning the system so that the exciter member 12 and work member 10 in combination with the adjustable resilient couplings 16 form a vibratory system having a natural frequency near the operating speed of the drive motor. When this tuning is properly effected the amplitude of vibration of the conveyor 10 may be as much as five to ten times as much as the amplitude would be were the system detuned or the motor operated at a speed quite removed from the resonant condition. Since the amplitude of vibration varies quite rapidly with small changes of tuning the adjustment of the preload on the non-linear springs exemplified by the annular rubber members 17 is quite effective in controlling the amplitude of vibration of the work member 10. This control is effective in either the assembly shown in FIGS. I through III or in the equivalent arrangement in FIG. IV in which the additional feature of changing the mass of the eccentric member is employed.

Various modifications may be made in details of construction without departing from the spirit or scope of the invention.

Having described the invention, I claim:

1. In a device of the class described, in combination, a work member to be vibrated, means for resiliently supporting the member, an exciter member, a rotating eccentric weight journaled in the exciter member for producing a vibratory force, guide means connecting the exciter member to the work member, resilient means comprising elements each of which has a spring rate that increases with compression of the element connecting the members and forming with the members a vibratory system having a natural frequency, said elements being arranged in pairs and oppositely stressed by relative motion between the members, said elements being each initially compressed an amount at least equal to the maximum displacement of the exciter member relative to the work member, and means for simultaneously adjusting the initial deflection of the elements and thus the natural frequency of vibration of the system comprising said members and said elements.

2. In a device of the class described, in combination, a resiliently supported work member, an exciter member mounted on the work member for relative movement with respect to the work member, a rotating eccentric weight journaled in the exciter member for producing vibratory movement of the exciter member, a plurality of rubber springs connecting the work member to the exciter member and forming with the members a vibratory system having a natural frequency substantially equal to the frequency of the vibratory movement of the exciter member, said rubber springs each having a non-linear force-deflection characteristic and being arranged in pairs such that one spring is compressed as the other is extended by relative movement between the members, and means for simultaneously adjusting the initial deflection of the springs whereby the natural frequency of the system comprising the members and the springs may be adjusted.

3. In a device of the class described, in combination, a resiliently supported work member, an exciter member, a plurality of guide links connecting the members for relative movement along a path, a rotating eccentric weight journaled in the exciter member for producing movement of the exciter member along the path, resilient means connecting the members and cooperating with the members to form a vibratory system, said resilient means comprising at least one pair of rubber members arranged such that one member is compressed as the other is extended by relative movement of the members, each of said rubber members having a non-linear force-deflection characteristic, and means for preloading the rubber members to vary the resonant frequency of the vibratory system.

4. A device as claimed in claim 3 in which the rubber members are annular in form and are stressed by force applied perpendicular to the plane of the annulus.

References Cited in the file of this patent

UNITED STATES PATENTS

| | | |
|---|---|---|
| 2,049,346 | Bebinger | July 28, 1936 |
| 2,163,249 | Sherwen | June 20, 1939 |
| 2,299,661 | Symons | Oct. 20, 1942 |
| 2,694,156 | Cerminara | Nov. 9, 1954 |
| 2,852,162 | Nauta | Sept. 16, 1958 |

FOREIGN PATENTS

| | | |
|---|---|---|
| 7,495 | Great Britain | Apr. 23, 1901 |